United States Patent Office 3,506,612
Patented Apr. 14, 1970

3,506,612
DIEPOXY POLYARYL MONOMERS AND POLY-
MERS AND METHOD FOR MAKING SAME
Roy G. Neville, Seattle, Wash., assignor to North American Rockwell Corporation, a corporation of Delaware
No Drawing. Filed May 10, 1967, Ser. No. 637,346
Int. Cl. C08f 7/00; C07d 1/00
U.S. Cl. 260—47                                  3 Claims

ABSTRACT OF THE DISCLOSURE

A method and composition for making a family of homologous bis-epoxy monomeric compounds containing no alkylaryl ether bonds, and of polymerizing the same. The invention comprises the synthesis of soluble difunctional epoxy monomers which may be polymerized in place to produce polymers having long chains and low cross-link density without simultaneous liberation of small molecules. Examples of the monomers are 1,4-bis[4(1-methyl,1,2-epoxyethyl)phenoxy]benzene and bis{4[4(1-methyl-1,2-epoxyethyl)phenoxy]phenyl}ether.

SUMMARY OF INVENTION

In the prior art, epoxy resins are usually glycidyl derivatives of bisphenol-A or aliphatic poly-alcohols, and they generally exhibit very poor resistance to heat or to chemical attack because they contain alkyl-aryl ether bonds. Also, they form explosive mixtures with liquid oxygen and cannot pass standard impact tests. Although some high temperature resistance resins such as the polyimides, polybenzimidazoles, and polyquinoxalines have provided some degree of success, these polymers require meticulous control of stoichiometry to attain usable molecular weights. At this stage the polymer is sparingly soluble even in exotic solvents. Final cure includes elimination of solvents and liberation of small volatile molecules (e.g. water) thus producing an intrinsically porous material. The invention comprises a family of epoxides having long chains and low cross-link density, the generic structure of which is generally as follows:

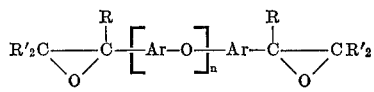

where:

Ar is a homocyclic aromatic structure selected from the class comprising: —C$_6$H$_4$—, —C$_6$H$_4$—O—C$_6$H$_4$—, —C$_6$H$_4$—C$_6$H$_4$—; R is selected from the class consisting of straight-chain alkyl groups having from one to five carbon atoms, phenyl radicals, or halogen-substituted phenyl radicals; and R' is selected from the class comprising H or straight-chain alkyl radicals having from one to five carbon atoms, $n$ being an integer from 2 to 6, inclusive.

Examples of the mentioned groups are:

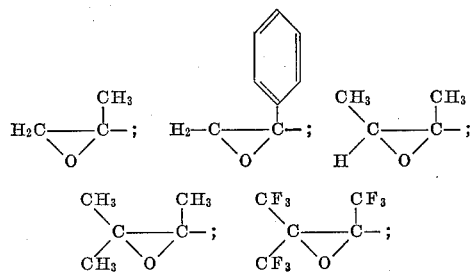

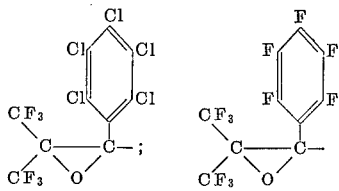

DETAILED DESCRIPTION OF INVENTION

The inventive concept disclosed herein includes a method for obtaining a group of homologous bis-epoxy monomeric compounds, capable of polymerization, having the structure expressed by chemical symbols in Equation 3 below. Epoxides of the general nature thus symbolized can be prepared by a series of sequential reactions which are broadly characterized by Equations 1 and 2 below, and illustrated by Examples I through VII. First, the parent aryl ether, or polyaryl polyether, is treated with an alpha-halo (preferably chloro or bromo) aliphatic acid halide (usually chloride), using appropriate procedures known to the prior art including the Friedel-Crafts procedure. This yields a disubstituted alpha-halo acyl derivative of the aryl ether, or polyaryl polyether according to the general reaction:

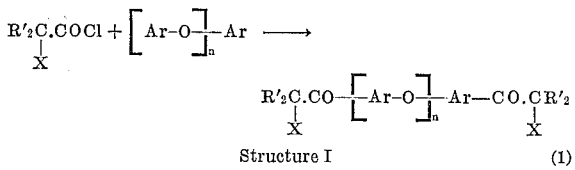

Structure I is then isolated, suitably purified by recrystallization as hereinafter described, then treated with a Grignard reagent to yield a bis-halohydrin intermediate:

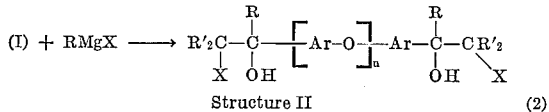

The bis-halohydrin, II, is then treated with an alcoholic solution of a base (preferably an alkali metal hydroxide, e.g. KOH), to eliminate the hydrogen and halogen elements and effect the ring-closure to the bis-epoxide:

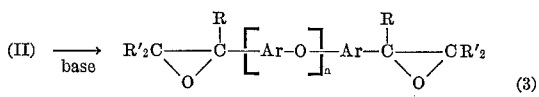

Polymerization of compounds of the above structure can readily be effected (as in the case of conventional epoxy resins) by treating the bis-epoxy monomers with Lewis acid catalysts, the most suitable being those selected from the class of aromatic sulfonic acids (e.g. p-toluenesulfonic acid).

The temperature and pressure required for cure will necessarily vary according to the particular monomer being polymerized. Thus, the pressure can range from 1 to 200 p.s.i., and the temperature can be within the range of ambient to about 300° F. in order to provide a satisfactory cure. Preferable conditions are 15 p.s.i. and 250° F.

The following are specific examples of the preparation of the intermediates and final compounds of the invention.

EXAMPLE I 1,4 - bis(4-chloroacetylphenoxy)benzene.—Finely powdered anhydrous aluminum chloride (117 g.; 0.88 mole), dry methylene chloride (180 ml.), and chloroacetyl chloride (90 g.; 0.79 mole) were cooled to −10° C. in a 2-liter three-necked standard taper flask, fitted with a motor-driven stirrer, thermometer, dropping funnel, and reflux condenser equipped with a Drierite® filled drying tube. 1,4-diphenoxybenzene (94.0 g.; 0.36 mole) in dry methylene chloride (200 ml.) was added, dropwise with stirring during 30 minutes, care being taken that the temperature of the mixture did not exceed 10° C. The mixture was stirred at 10° C. for 2.5 hours, during which gaseous hydrogen chloride was copiously evolved. The mixture was then allowed to stand, unstirred, overnight, at 20° C. The blood-red solution was poured onto crushed ice (ca. 2 kg.), and methylene chloride (500 ml.) was added. The organic layer was washed to neutrality with water, then dried over anhydrous magnesium sulfate. The solvent was removed on the steam bath to give a pale yellow crystalline solid in 91% yield. Two recrystallizations from isopropanol, using decolorizing charcoal, gave colorless needle-like crystals which melted sharply at 176° C.

*Analysis.*—Calcd. for $C_{22}H_{16}Cl_2O_4$ (percent): C, 63.63; H, 3.88; Cl, 17.08. Found (percent): C, 63.53; H, 3.88; Cl, 16.87.

EXAMPLE II 1,4 - bis[4(1-hydroxy-1-methyl-2-chloroethyl)phenoxy] benzene.—To a 2 molar solution of methylmagnesium bromide in tetrahydrofuran (125 ml.; 0.25 mole), cooled to —5° C., a solution of 1,4-bis(4-chloroacetylphenoxy) benzene (41.5 g.; 0.1 mole) in anhydrous tetrahydrofuran (850 ml.) was added during a period of 25 minutes. After stirring an additional 45 minutes at —5° C., the solution was poured on to a mixture of crushed ice (ca. 1 kg.) and concentrated sulfuric acid (100 ml.). The tetrahydrofuran layer was washed to pH 7 with water, dried over anhydrous magnesium sulfate, and filtered. The tetrahydrofuran was removed by means of a rotary evaporator without heating to give the desired bis-chlorohydrin in theoretical yield as a pale amber viscous liquid. It is very important indeed that, during the removal of the tetrahydrofuran solvent, the bis-chlorohydrin is not heated above room temperature. If the bis-chlorohydrin is heated to 45–50° C., unwanted chlorovinyl side products are formed. The presence of these side products vitiates the yield of the desired bis-epoxide, and makes its purification very difficult.

EXAMPLE III 1,4-bis[4(1-methyl-1,2-epoxyethyl)phenoxy]benzene.— The product from Example II was dissolved in anhydrous methanol, filtered, cooled to 10° C., then treated with 5 N methanolic potassium hydroxide (39.6 ml.; 0.2 mole). The mixture was stirred at 10° C. for 30 minutes, filtered rapidly through a coarse-grade sintered-glass funnel, the solids were washed with fresh methanol (200 ml.), and the filtrate was refrigerated overnight at —20° C. The crystalline bis-epoxide was quickly filtered at —20° C., pressed, drained, and dried in vacuo to yield 36.8 g. (98.4%) of snow-white crystals, M.P. 100–101° C. Recrystallization from the minimum volume of acetone at 30° C., and cooling to —30° C., yielded pure white microcrystalline bis-epoxide which melted sharply at 103.5° C.

*Analysis.*—Calcd. for $C_{24}H_{22}O_4$ (percent): C, 76.99; H, 5.92. Found (percent): C, 76.41; H, 5.84.

EXAMPLE IV

Bis[4(4-chloroacetylphenoxy)phenyl]ether.—By allowing anhydrous aluminum chloride (0.88 mole), chloroacetyl chloride (0.79 mole) and bis(4-phenoxyphenyl) ether (0.36 mole) to react together in anhydrous methylene chloride (900 ml.) at 25° C. for 5 days, a 69% yield of the title compound was obtained as pale tan crystals. Recrystallization from a 1:2 mixture of benzene and acetone, using decolorizing charcoal, yielded colorless platelets with a nacreous reflex, M.P. 161° C.

*Analysis.*—Calcd. for $C_{28}H_{20}Cl_2O_5$ (percent): C, 66.28; H. 3.97; Cl, 13.98. Found (percent): C, 66.57; H, 3.95; Cl, 13.63.

EXAMPLE V

Bis{4[4(1 - hydroxy-1-methyl-2-chloroethyl)phenoxy] phenyl}ether.—A solution of bis[4(4-chloroacetylphenoxy)phenyl] ether (Example IV) (50.7 g.; 0.1 mole) in anhydrous tetrahydrofuran (1 liter) and benzene (300 ml.) was added during 45 minutes to stirred 2 molar methyl magnesium bromide (125 ml.; 0.25 mole) at —5° C. The mixture was then worked up, as in Example II, to give a theoretical yield of viscous pale amber liquid.

EXAMPLE VI

Bis{4[4(1 - methyl - 1,2-epoxyethyl)phenoxy]phenyl} ether.—The product from Example V was dissolved in anhydrous methanol (700 ml.), cooled to 5° C., and 5 normal methanolic potassium hydroxide (39.6 ml.; 0.2 mole) was added, with stirring, during 10 minutes. The mixture was worked up (as in Example III) to yield 51% of a white microcrystalline solid, which was recrystallized by dissolving in the minimum volume of anhydrous tetrahydrofuran at 30° C., filtering from residual potassium chloride, and cooling to —30° C. The white crystalline bis-epoxide melted sharply at 119° C. The infrared spectrum of this compound showed strong absorption for the oxirane group at 910 cm.$^{-1}$, and no absorption due to —OH or —Cl.

*Analysis.*—Calcd. for $C_{30}H_{26}O_5$ (percent): C, 77.24; H, 5.62. Found (percent): C, 77.63; H, 5.43.

EXAMPLE VII

Polymerization of the bis-epoxides.—The above-described bis-epoxides were polymerized cationically using p-toluenesulfonic acid as the catalyst. 1,4-bis[4(1-methyl-1,2-epoxyethyl)phenoxy]benzene (Example III) was polymerized in anhydrous tetrahydrofuran with 0.3 phr. of p-toluenesulfonic acid. The mentioned concentration of 0.3 part per hundred of resin (phr.) represents a suitable approximation for achieving the desired reaction, but could be varied somewhat without materially changing such reaction. However, the mentioned catalyst, paratoluenesulfonic acid is the specific preferred and most successful catalyst tested of all Lewis acids. For example, boron trifluoride-ethylamine complex was an extremely slow catalyst and therefore totally unsuitable, while boron-trifluoride-etherate was far too fast and may actually cause molecular rearrangement before polymerization can take place. Most of the inorganic Lewis acids tested were ineffective catalysts for the bis-epoxides disclosed herein, as were also the organic compounds including both Lewis acids and Lewis bases. The resin solution, containing the p-toluenesulfonic acid catalyst, was cured by heating under any of the following circumstances: 1 hour at 177° C. (350° F.), 3 hours at 116° C. (240° F.), or 4 days at 49° C. (120° F.). With the same concentration of catalyst, the bis-epoxide described in Example VI was cured after 2 hours at 350° F. or 3 hours at 240° F.

EXAMPLE VIII

Differential thermal analysis data.—Differential thermal analysis tests were carried out in air at a heating rate of 10° C. per minute. Specimens of the cured bis-epoxides (see Example VII) showed the following weight losses:

Example III: 10 percent weight loss at 4775° C.; 50 percent weight loss at 580° C.

Example VI: 10 percent weight loss at 460° C.; 50 percent weight loss at 520° C.

From the foregoing, it may be seen that a given weight loss requires a higher temperature for the resin of Example III compared with that of Example VI, which demonstrates that higher resistance to temperature is achieved by the coating of Example III than that achieved by Example VI. Moreover, in contrast with the foregoing test results, conventional epoxy resins known to the prior art such as glycidyl derivatives of bisphenol-A or aliphatic poly-alcohols containing alkyl-aryl ether bonds break down rapidly at temperatures as low as 250° C. or less.

Each cured polymer described above was subjected to a series of tests to evaluate its suitability and superiority as resin coating materials. The mentioned tests included liquid oxygen impact testing according to national standards set by the National Aeronautics and Space Administration. Both the titania loaded coatings and graphite loaded coatings conclusively demonstrated their capacity for safe use in the presence of liquid oxygen since no explosion and no deterioration in the coatings occurred during contact with liquid oxygen or during impact. In contrast with the foregoing results, every known epoxy coating in the prior art forms an explosive mixture with liquid oxygen when subjected to impact. The stated coatings were also subjected to chemical resistance tests wherein a single drop of test liquid was placed upon a coated surface of the cured polymer and allowed to remain at room temperature for a period of 24 hours. After this exposure, the test surface was wiped dry and examined microscopically for signs of etching or deterioration, in connection with which no such effects were found. The liquids tested included concentrated nitric acid, standard JP-6 hydrocarbon jet fuel, ethylene glycol, diester lube oil, and a 30 percent aromatic mixture of toluene, xylene, benzene and isooctane, the balance comprising aliphatic fuel constituents. No blistering, softening or other evidence of attack was observed in any of the liquid contact tests. The mentioned coatings were also tested by applying the same to an aluminum panel which was thereafter bent over the surface of a cone having approximately one and one-half inch radius at its base and approximately one-eighth inch radius at its tip, as a result of which no separation or surface voids were noted in the coatings, thus demonstrating good film flexibility for both the filled and the unfilled cured polymers. The coatings disclosed hereinabove were also subjected to nitrogen tetroxide exposure tests consisting of a one-half hour partial immersion of specimens of the cured polymers in liquid nitrogen tetroxide at 20° C. After drying in air for one-half hour, the specimens were exposed at 95° F. air at a relative humidity of 95% for 23½ hours. The coatings thus tested showed no visible signs of attack from the nitrogen tetroxide immersion. After the humidity exposure, no evidence of blistering, softening or loss of adhesion was observed. The mentioned coatings were also subjected to aging tests at elevated temperatures up to 600° F. for aging periods of 500 hours. The mentioned coatings disclosed in this case demonstrated excellent resistance at a temperature of 450° F. for the mentioned 500 hour period when applied over a substrate, and thicker specimens such as approximately one-eighth inch thick laminates of the novel resins with glass fiber layers showed excellent aging at temperatures of 500° F. and over, for the stated 500 hour period of exposure. The novel resin coatings disclosed herein were also tested to determine their adhesive property by applying the same to substrate panel and immersing the panel in water for 24 hours, after which the specimen panels were removed and dried. The panels were scratched through the coating, and masking tape was thereafter applied over the scratched area and pressed with a force of approximately four and one-half pounds. Thereafter, the tape was removed with one quick stripping motion, after which it was found that the coating remained intact and did not separate or peel from the substrate.

While the particular details set forth above are fully capable of attaining the objects and providing the advantages suggested herein, the specific materials and methods thus disclosed are merely illustrative and could be varied to produce the same results without departing from the scope of the inventive concept as defined in the appended claims.

I claim:
1. A compound having the chemical structure:

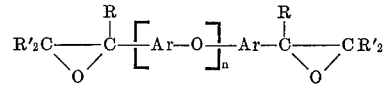

wherein:
Ar is a homocyclic aromatic ring; R is selected from the class consisting of straight-chain alkyl groups having from one to five carbon atoms, phenyl radicals, and halogen-substituted phenyl radicals; R' is selected from the class comprising H or straight-chain alkyl radicals having from one to five carbon atoms; and n is a whole integer from 1 to 6.

2. The compound as set forth in claim 1 above, wherein:
Ar is selected from the class comprising —C₆H₄—, —C₆H₄—O—C₆H₄—, and C₆H₄—C₆H₄—.

3. The cured polymer resulting from heating in the presence of a catalyst comprising p-toluenesulfonic acid. the compound having the structural formula:

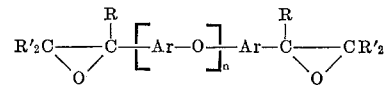

wherein:
Ar is an aromatic ring;
R is a straight-chain aliphatic radical selected from the class comprising saturated alkyl compounds;
R' is selected from the class comprising H or straight-chain alkyl radicals having from one to five carbon atoms; and
n is a whole integer from 1 to 6.

References Cited
UNITED STATES PATENTS 3,203,912  8/1965  Mark et al. _____ 260—9

OTHER REFERENCES

Szmant, H. H., Organic Chem., Prentice Hall, 233–4 (1957).

JAMES A. SEIDLECK, Primary Examiner

C. A. HENDERSON, JR., Assistant Examiner

U.S. Cl. X.R.

117—132, 161; 161—185, 186; 260—2, 37, 348